United States Patent
Natarajan et al.

(10) Patent No.: US 7,512,648 B2
(45) Date of Patent: Mar. 31, 2009

(54) DIVISION ALGORITHM

(75) Inventors: Venkataraman Natarajan, Bangalore (IN); Prasad Ghatigar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 11/020,983

(22) Filed: Dec. 22, 2004

(65) Prior Publication Data
US 2006/0136542 A1   Jun. 22, 2006

(51) Int. Cl.
G06F 7/535      (2006.01)

(52) U.S. Cl. ..................................... 708/653

(58) Field of Classification Search .............. 708/653
See application file for complete search history.

(56) References Cited

U.S. PATENT DOCUMENTS 5,696,713 A * 12/1997 Kovacs ............... 708/653
2004/0098442 A1 * 5/2004 Kishore et al. ....... 708/653

* cited by examiner

*Primary Examiner*—David H Malzahn
(74) *Attorney, Agent, or Firm*—Murthy S.K.

(57) ABSTRACT

According to an aspect of the present invention, a quotient of a dividend divided by a divisor may be determined after reducing the dividend, divisor, and the remainder by using operations such as add, subtract, multiply, shift, AND which may result in reduced processor cycles (time).

7 Claims, 5 Drawing Sheets

DIVISION ALGORITHM

BACKGROUND

A computer network generally refers to a group of interconnected wired and/or wireless devices such as, for example, laptops, mobile phones, servers, fax machines, printers, etc. Computer networks often transfer data in the form of packets from one device to another device(s). In transferring a packet, a device may divide the packet into fragments to efficiently transfer the packet between devices and/or store the packet in buffers

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a system and a device to fragment packets based upon a division algorithm. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
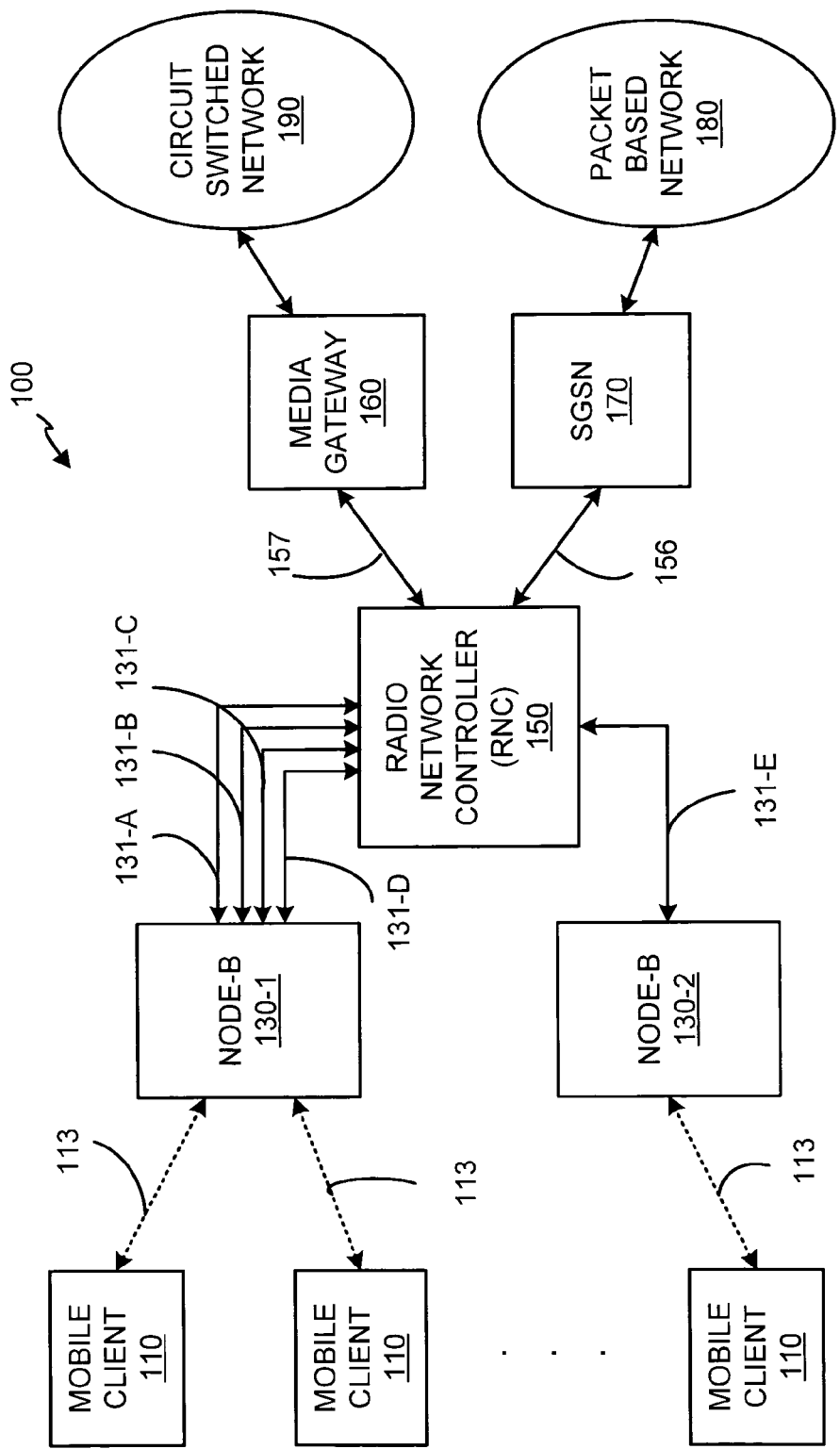
FIG. 1 illustrates an embodiment of a system in which packets may be fragmented using a division algorithm.

An embodiment of an operating environment 100 is illustrated in FIG. 1. In one embodiment, the environment 100 may represent a Universal Mobile Telecommunications System (UMTS) terrestrial radio access network (UTRAN). However, one or more aspects of the present invention may be implemented in other environments as well such as, for example, wired and/or wireless local area networks. The environment 100 may comprise one or more mobile clients 110, node-Bs 130-1, 130-2, a radio network controller (RNC) 150, a media gateway (MGW) 160, a serving GPRS support node (SGSN) 170, a packet based network 180, and a circuit switched network 190. The mobile clients 110, node-Bs 130-1, 130-2, and the RNC 150 together may be referred to as a radio access network (RAN), and the MGW 160, SGSN 170, packet based network 180, and the circuit switched network 190 may together be referred to as a core network.

The mobile clients 110 may send/receive packets to/from a corresponding base station such as the node-B 130-1 via an air interface or a radio interface. The mobile clients 110 may comprise hardware, software, and firmware to generate/process a packet respectively based on the voice and/or data signals generated/provided by/to a user. Techniques such as the wideband code division multiple access (WCDMA) may be employed to send/receive the packets.

The circuit switched network 190 may send/receive packets comprising data such as voice, multimedia etc., to/from the MGW 160. The circuit switched network 190 may be coupled to the MGW 160 using interfaces such as asynchronous transfer mode (ATM) adaptation layer (AAL). The circuit switched network 190 may comprise networks such as a public switched telephone network (PSTN, not shown).

The packet based network 180 may send/receive packets to/from the SGSN 170. The packet based network 180 may be coupled to the SGSN 170 via the Gateway GPRS support node (GGSN, not shown) to send/receive packets on interfaces such as the AAL. The packet based network 180 may comprise, for example, a local area network (LAN), a wide area network (WAN), and the Internet.

The media gateway (MGW) 160 may support advanced voice and multi-media services. The MGW 160 may be coupled to the RNC 150 to send/receive data to the mobile clients 110 and/or to the packet based network 180 comprising one or more client/server systems. The MGW 160 may support inter-working of voice connections between the circuit switched network 190 and the RNC 150. The MGW 160 may support protocols such as the media gateway control protocols (MGCP).

The Serving GPRS support node (SGSN) 170 may provide an interface between the packet based network 180 and the RNC 150. The SGSN 170 may perform various functions such as the mobility management, traffic routing, user authentication, and authorization. The SGSN 170 may interface with the packet based network 180 via a GGSN (not shown) based on techniques such as frame relay.

The Node-B 130-1 and the Node-B 130-2 may send/receive packets to/from the mobile clients 110 on an air interface or radio interface 113 using techniques such as the WCDMA. In one embodiment, the Node-B 130-1 may receive a packet from one of the mobile clients 110, divide the packet into fragments, and send the fragments on one or more links 131 to RNC 150. The links 131 may comprise, for example, a T1 or an E1 link. Also, fragments received on links 131 may be reassembled into a packet before sending the packet to the corresponding mobile client 110. The node-B 130-1 may divide the incoming packet into fragments, for example, to efficiently transfer data via links 131 and/or to store the fragments in a buffer.

The RNC 150 may be coupled to the MGW 160, the SGSN 170, the node-B 130-1 and 130-2, and to other RNCs (not shown). The RNC 150 may support protocol exchanges between the core network and the radio access network, may perform operation and maintenance of the radio access network, and may multiplex data received from the circuit switched network 190 and the packet based network 180 before sending to the node-B 130-1/130-2. The RNC 150 may receive fragments from the node-B 130-1 on links 131, may reassemble the fragments into packets such as IP packets or data streams, and may then send the packet on a corresponding path 156 or 157.

The RNC 150 may receive a packet on path 156 and/or 157, may divide the packet into fragments, and then may send the fragments on the links 131 or may store the fragments in buffers. The RNC 150 may divide the packet into fragments, for example, to efficiently transfer the packet. In one embodiment, the RNC 150 may divide a packet of larger size, for example, 1500 bytes as may be the case in a file transfer protocol (FTP) packet into smaller size fragments, for example, of size 48 bytes and may then send the smaller size fragments on multiple links such as the T1/E1 links 131 provisioned between the RNC 150 and the node-B 130.

Figure 2:
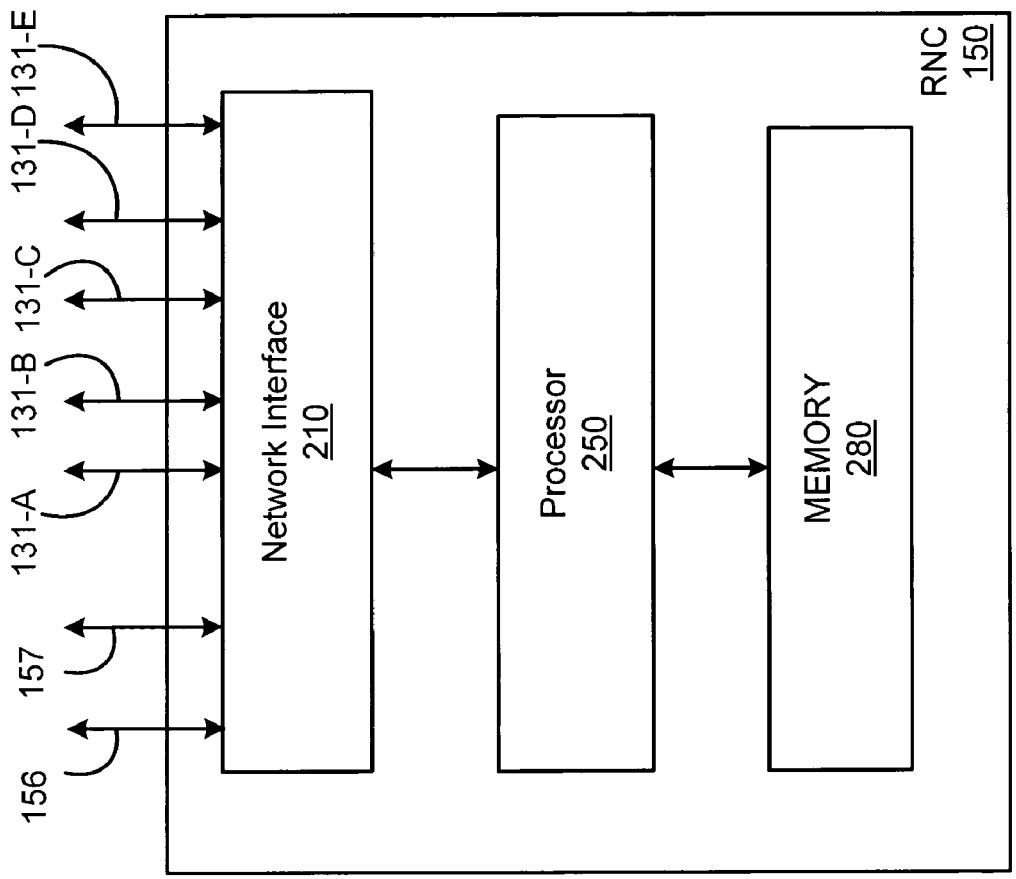
FIG. 2 illustrates an embodiment of a device that fragments packets using a division algorithm.

An embodiment of the RNC 150 is illustrated in FIG. 2. The embodiment of FIG. 2 may comprise one or more network interfaces 210, a processor 250, and a memory 290. For illustration, an embodiment of the RNC 150 fragmenting the packet received on path 156 into fragments and sending the fragments on links 131 is described below. However, several aspects of the present invention may be implemented in the node-B 130-1, 130-2 or other network devices such as, for example, mobile phones, personal digital assistants, network routers, and/or network switches.

The network interface 210 may receive a packet on path 156, may send the packet to the processor 250 for fragmenting, and may forward the fragmented packet on one or more links 131-A through 131-D. The network interface 210 may provide physical, electrical, and protocol interfaces to send/receive fragments to/from the node-B 130-1, 130-2, and to send/receive packets to/from the MGW 160 and the SGSN 170.

The memory 280 may store a packet and/or one or more fragments. In one embodiment, the memory 280 may also store data and/or instructions corresponding to a specific task to be performed by the processor 250 such as, for example, a division algorithm, packet size, fragment size, etc.

The processor 250 may receive a number of fragments, may reassemble the fragments to form a packet, and may then send the packet on an appropriate path via network interface 210. In addition, the processor 250 may perform operation and maintenance of the radio access network and may queue packets and fragments based on quality of service (QoS) parameters. The processor 250 may further receive a packet, may determine the number of fragments to divide a packet into, may divide the packet into a corresponding number of fragments, and then may send the fragments to a corresponding device via the network interface 210.

In one embodiment, the processor 250 may comprise, for example, an Intel® network processor such as an IXP2400. In one embodiment, the processor 250 may comprise an arithmetic logic unit (ALU), which may support arithmetic operations such as addition, subtraction, and multiplication, logical operations such as shifting, bitwise AND operations, etc. However, the ALU may lack support for other arithmetic operations such as integer division (DIV) operations and integer modulus (MOD) operations. In such a processor 250, division and modulus operations may be performed using other arithmetic operations.

Figure 3:
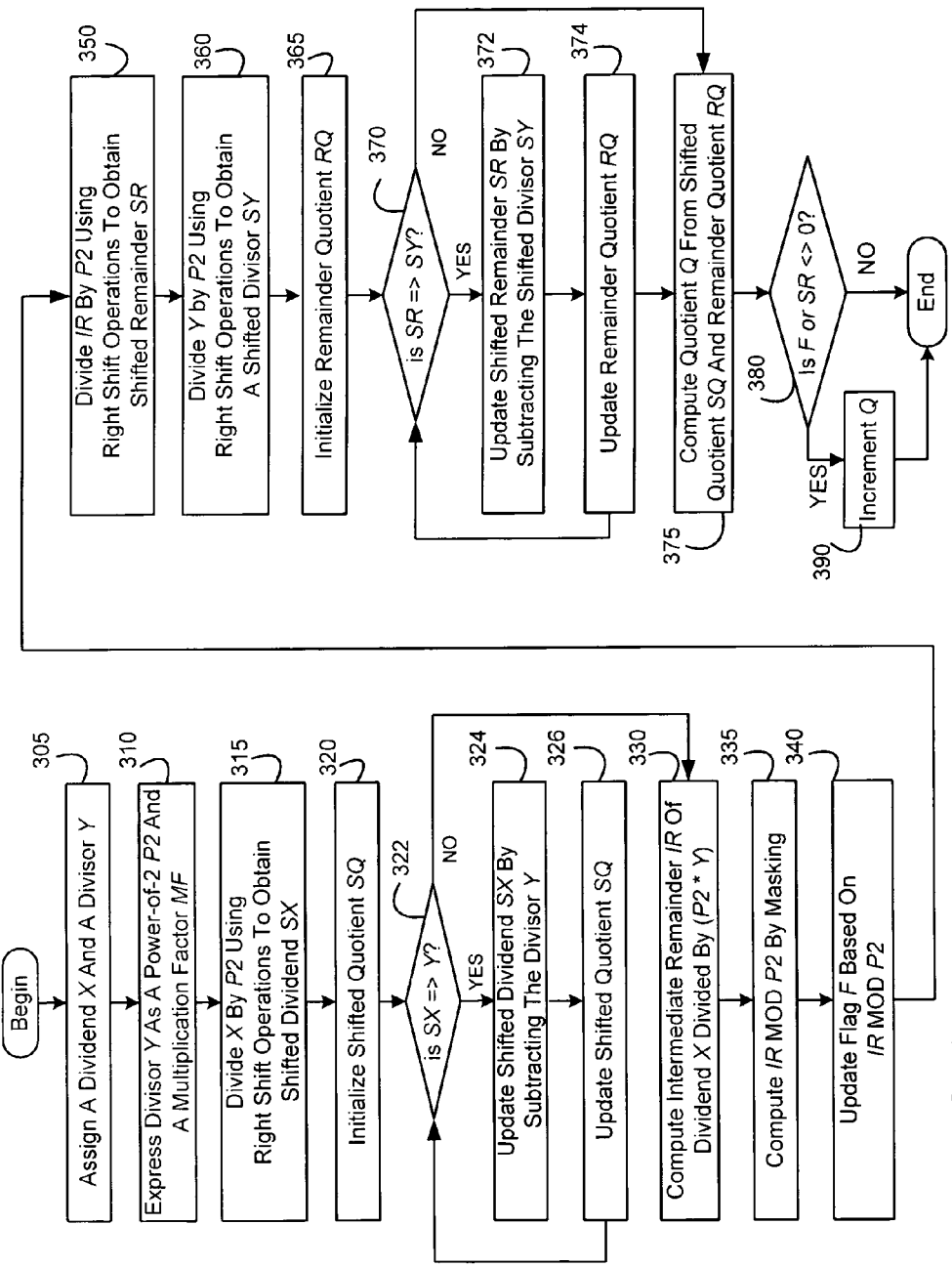
FIG. 3 illustrates details of a division algorithm.

In one embodiment, the processor 250 may determine a number of fragments to divide each packet into based on the packet size and fragment size using the division algorithm illustrated in FIG. 3. For illustration, the RNC 150 may receive a packet of 1500 bytes and may divide the packet into fragments of 48 bytes. In general, the size of the fragment may be defined based on the technology such as a point-to-point multilink protocol (PPP-ML), ATM, PPP, a configured value or the size of the buffer used to store the fragments etc. In one embodiment, a library function may implement the described division algorithm in order to ease a software developer's use of such a division algorithm when programming for a processor lacking an integer division instruction.

In block 305, the processor 250 may receive a packet, may determine/obtain the packet size, and may assign the packet size to a dividend X. The processor 250 may further determine fragment size and assign the fragment size to a divisor Y. For example, the dividend X may equal 1500 bytes and the divisor Y may equal 48 bytes.

In block 310, the processor 250 may express the divisor Y as product of a power-of-two P2 and a multiplication factor MF. For example, a divisor Y of 48 may be expressed with a power-of-two P2 of 16 and a multiplication factor of 3. In block 315, the processor 250 may compute a shifted dividend SX by right shifting the dividend X by the integer exponent N of the power-of-two P2. In effect, every right shift is equivalent to dividing by 2. Therefore, a right shift by the power-of-two exponent N in essence is dividing by the power-of-two P2. In the above example, 1500 may be right shifted 4 times (.i.e. divided by 16) to obtain a shifted dividend SX of 93.

The processor 250 may then divide the shifted dividend SX by the divisor Y using arithmetic and logical operations other than a division operation such as, for example, subtraction, addition, and comparison operators as depicted in blocks 320, 322, 324 and 326. To this end, the processor 250 in block 320 may initialize a shifted quotient SQ to an initial value (e.g. 0).

In block 322, the processor 250 may utilize a comparison operation to determine whether the shifted dividend SX has a predetermined relationship to (e.g. greater than or equal to) the divisor Y. In response to determining that the shifted dividend SX has the predetermined relationship to the divisor Y, the processor 250 may continue to block 324 in order to update the shifted dividend SX and the shifted quotient SQ. Otherwise, the processor 250 may continue to block 330 to compute an intermediate remainder IR. In the present example, the processor 250 in one embodiment may continue to block 324 since the shifted dividend SX of 93 is greater than the divisor Y of 48.

In block 324, the processor 250 may update the shifted dividend SX by subtracting the divisor Y from the shifted dividend SX. For example, the divisor Y of 48 may be subtracted from a shifted dividend SX of 93 to obtain an updated shifted dividend SX of 45. In block 326, the processor 250 may update the shifted quotient SQ by incrementing the shifted quotient SQ by 1. For example, the shifted quotient SQ may equal 1 after updating the shifted dividend SX from 93 to 45 in the present example.

After updating the shifted dividend SX and the shifted quotient SQ, the processor 250 may return to block 322 to determine whether the updated shifted dividend SX has a predetermined relationship to (e.g. greater than or equal to) the divisor Y. In dividing 1500 by 48, the processor 250 in one embodiment may perform the operations of blocks 322, 324 and 326 until the processor 250 obtains a shifted dividend SX of 45 and a shifted quotient SQ of 1.

In block 330, the processor 250 may compute an intermediate remainder IR of the dividend X divided by the product of the power-of-two P2 and the divisor Y. In one embodiment, the processor 250 may compute the intermediate remainder IR by subtracting the product of the shifted quotient SQ, the power-of-two P2, and the divisor Y from the dividend X. For example, the processor 250 when computing 1500 divided by 48 may compute an intermediate remainder IR of 732 (i.e. 1500−(1*16*48)).

In block 335, the processor 250 may compute the remainder or modulus of dividing the intermediate remainder IR by the power-of-two P2. In one embodiment, the processor 250 may compute such a modulus by performing a bitwise AND operation of the intermediate remainder IR with an appropriate mask P2_M for the P2. In particular, the power-of-two mask P2_M may comprise a '1' for the N least significant bits and a '0' in the other bit positions. In the above example, the processor 250 may perform a bit-wise AND operation of an intermediate remainder IR of 732 (0×2DC) and a power-of-two mask P2_M of 15 (0×F) to obtain a modulus of 12 (0×C). In block 340, the processor 250 may update a flag F to indicate whether dividing the dividend X by the divisor Y results in a remainder. In one embodiment, the processor assigns the flag F a value of 1 if the modulus obtained in block 335 is non-zero and a value of 0 otherwise. Accordingly, in the present example of 1500 divided by 48, the processor 250 assigns the flag F a value of 1 since the above modulus (12) is non-zero.

In block 350, the processor 250 may compute a shifted remainder SR by right shifting the intermediate remainder IR by the integer power-of-two exponent N which in essence divides the intermediate remainder IR by the power-of-two P2. In the above example, the processor 250 may generate a shifted remainder SR of 45 as a result of shifting the intermediate remainder IR of 732 to the right by 4 bits. In block 360, the processor 250 may compute a shifted divisor SY by shifting the divisor Y to the right by the exponent N. The processor 250 in the ongoing example may generate a shifted divisor SY of 3 as a result of shifting the divisor Y of 48 to the right by 4. In another embodiment, the processor 250 may simply assign the shifted divisor Y the value of the multiplication factor MF to arrive at the same end result.

The processor 250 may then divide the shifted remainder SR by the shifted divisor SY using arithmetic and logical operations other than a division operation such as, for example, subtraction, addition, and comparison operators as depicted in blocks 365, 370, 372 and 374. To this end, the processor 250 in block 365 may initialize a remainder quotient RQ to an initial value (e.g. 0).

In block 370, the processor 250 may utilize a comparison operation to determine whether the shifted remainder SR has a predetermined relationship to (e.g. greater than or equal to) the shifted divisor SY. In response to determining that the shifted remainder SR has the predetermined relationship to the shifted divisor SY, the processor 250 may continue to block 372 in order to update the shifted remainder SR and the remainder quotient RQ. Otherwise, the processor 250 may continue to block 375 to compute a quotient Q. In the present example, the processor 250 in one embodiment may continue to block 372 since the shifted remainder SR of 45 is greater than the shifted divisor Y of 3.

In block 372, the processor 250 may update the shifted remainder SR by subtracting the shifted divisor SY from the shifted remainder SR. For example, the shifted divisor SY of 3 may be subtracted from a shifted remainder SR of 45 to obtain an updated shifted remainder SR of 42. In block 374, the processor 250 may update the remainder quotient RQ by incrementing the remainder quotient RQ by 1. For example, the remainder quotient RQ may equal 1 after reducing the shifted remainder SR to 42 in the present example.

After updating the shifted remainder SR and the remainder quotient RQ, the processor 250 may return to block 370 to determine whether the updated shifted remainder SR has a predetermined relationship to (e.g. greater than or equal to) the shifted divisor SY. In dividing 1500 by 48, the processor 250 in one embodiment may perform the operations of blocks 370, 372 and 374 until the processor 250 obtains a shifted remainder SR of 0 and a remainder quotient SQ of 15.

In response to the shifted remainder SR being less than the shifted divisor SY, the processor 250 in block 375 may compute the quotient Q by adding the remainder quotient RQ to the product of the shifted quotient SQ and the power-of-two P2. As a result, the processor 250 in the above example may obtain a quotient Q of 31 by adding a remainder quotient RQ of 15 to the product 16 (i.e. a shifted quotient SQ of 1 times a power-of-two of 16).

In block 380, the processor 250 may determine whether dividing the dividend X by the divisor Y resulted in a remainder. In particular, the processor 250 may determine that there is a remainder if the flag F or the shifted remainder SR is non-zero. For example, dividing 1500 by 48 results in a remainder since the flag F is non-zero and the shifted remainder SR is zero. In response to determining that there is a remainder, the processor 250 in block 390 may increment the quotient Q by one in order to account for another fragment to send the remaining byte(s) of the packet. In the above example, a packet of 1500 bytes may be divided into 32 fragments each with a maximum size of 48 bytes.

In an embodiment that only requires the integer quotient Q without consideration of a remainder portion, the processor 250 may forego the operations of blocks 335, 340, 380 and 390. These operations to determine whether a remainder is present and therefore may be eliminated if no remainder determination is needed.

Figure 4A:
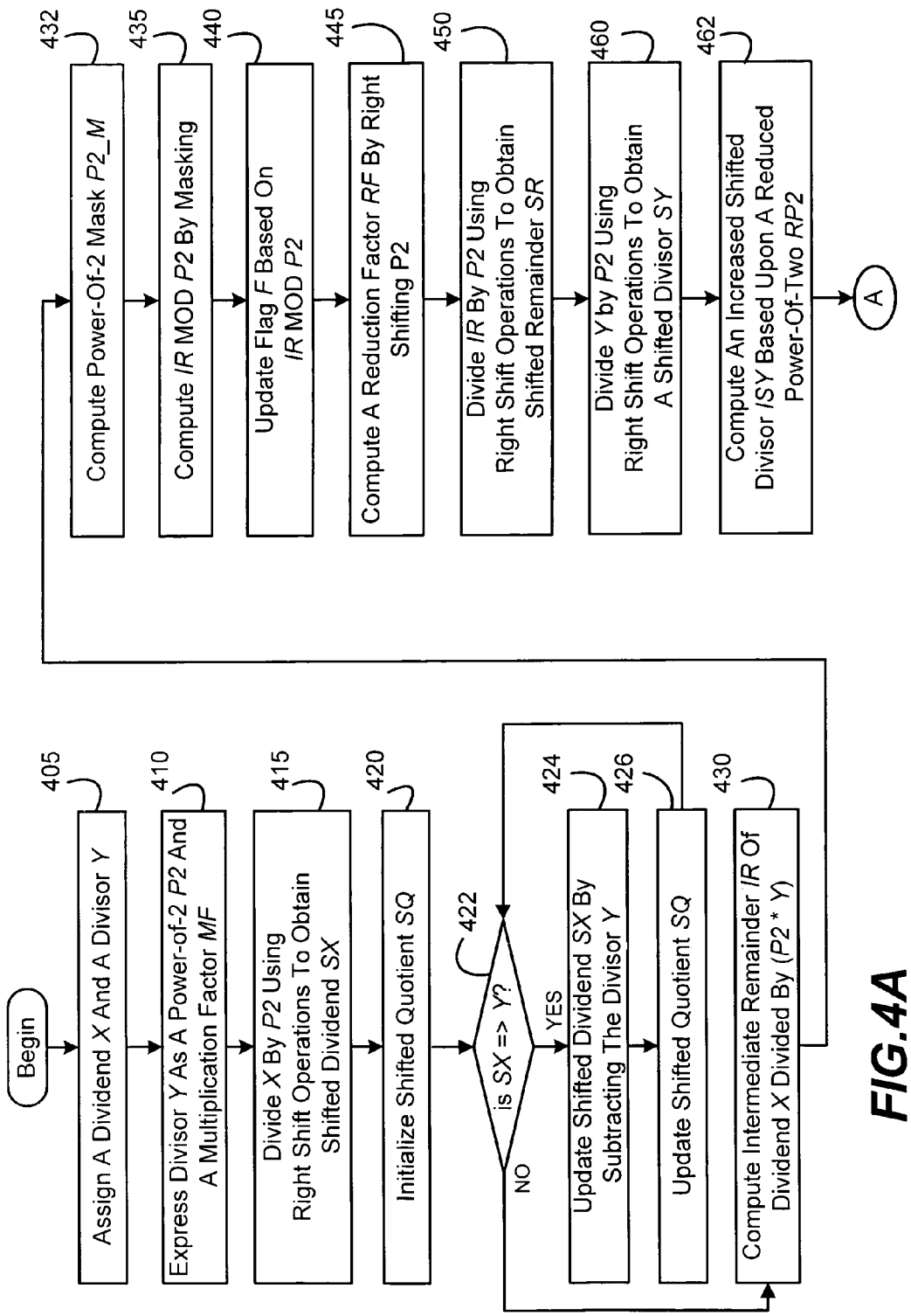
FIGS. 4A-4B illustrate details of an enhanced division algorithm.
Figure 4B:
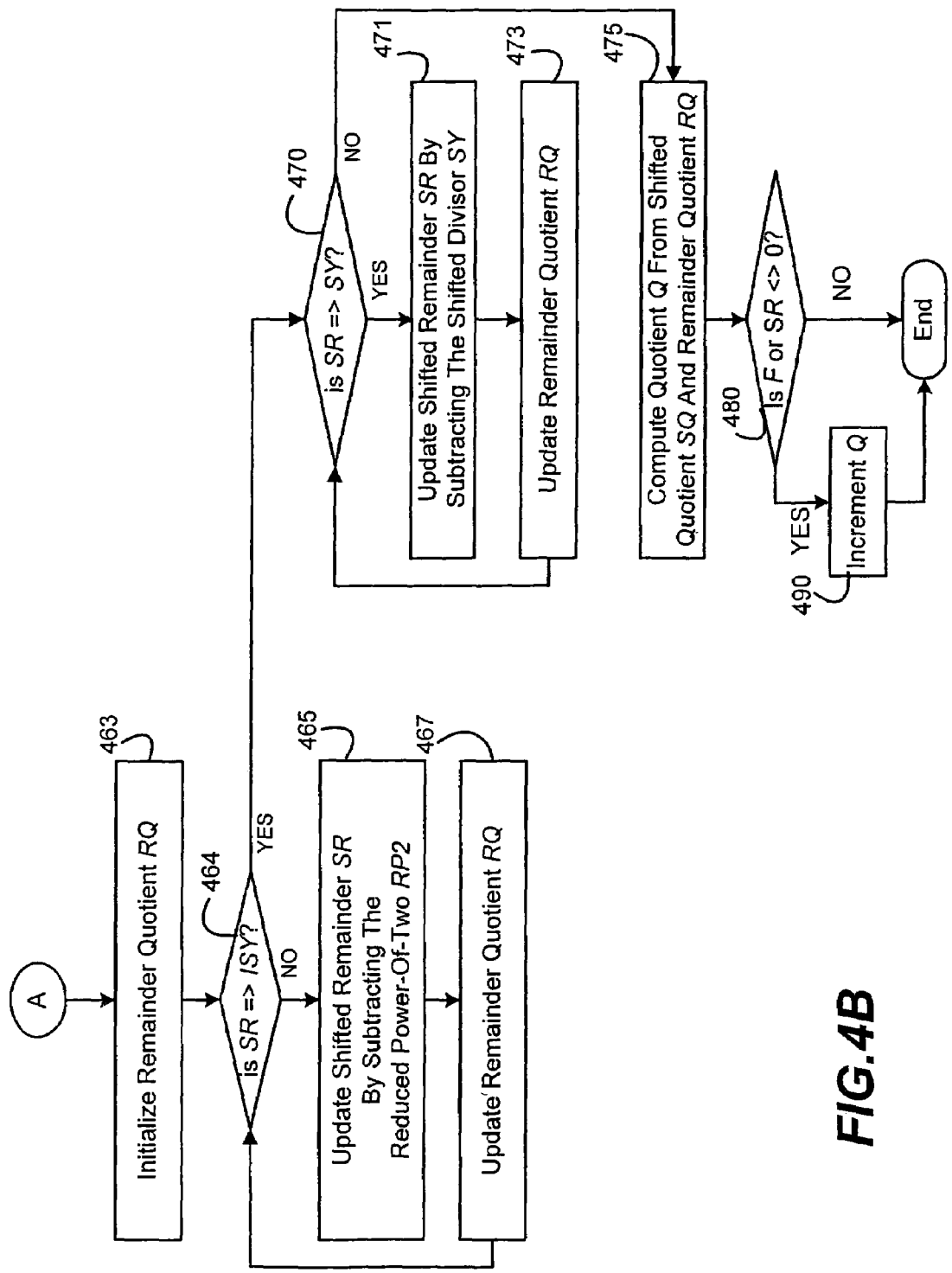

A flow-chart depicting an enhanced division algorithm is illustrated in FIG. 4. In block 405, the processor 250 may assign a packet size to a dividend X and a fragment size to a divisor Y in a manner similar to block 305 of FIG. 4. In one embodiment, the processor 250 may assign 1500 to the dividend X and 48 to the divisor Y. In block 410, the processor 250 may express the divisor Y as product of a power-of-two P2 and a multiplication factor MF. In one embodiment, the processor 250 may dynamically determine the exponent N of the power-of-two P2. To this end, the processor 250 may execute a find-first-bit-set (FFS) instruction provided by the IXP2400 network processor from Intel® to find the first set bit of the divisor Y. The FFS instruction may return a value between 0 and 31 based on the position of the first set bit starting from the least significant bit position. For example, executing the FFS instruction on a divisor Y of 48 (110000) may return a value of 4 since the first set bit starting from least significant bit is bit 4 (i.e. the fifth least significant bit). In another embodiment, a FFS operation may be implemented using one or more arithmetic/logic instructions other than a FFS instruction.

In block 415, the processor 250 may compute a shifted dividend SX by right shifting the dividend X by the exponent N of the power-of-two P2 in a manner similar to block 315 of FIG. 3. In the above example, the dividend X of 1500 may be shifted to the right by 4 bits (.i.e. divided by 16) to obtain a shifted dividend SX of 93.

The processor 250 may then divide the shifted dividend SX by the divisor Y using arithmetic and logical operations other than a division operation such as, for example, subtraction, addition, and comparison operators as depicted in blocks 420, 422, 424 and 426 and in a manner similar to blocks 320, 322, 324 and 326 of FIG. 3. In an example of dividing 1500 by 48, the processor 250 as result of performing the operations of blocks 420, 422, 424 and 426 may obtain a shifted quotient SQ of 1 and a shifted dividend SX of 45 which is less than the divisor Y of 48.

In block 430, the processor 250 may compute an intermediate remainder IR of the dividend X divided by the product of the power-of-two P2 and the divisor Y in a manner similar to block 330 of FIG. 3. For example, the processor 250 when computing 1500 divided by 48 may compute an intermediate remainder IR of 732 (i.e. 1500−(1*16*48)). In block 432, the processor 250 may compute a power-of-two mask P2 for the dynamically determined power-of-two P2. To this end, the processor 250 may shift the value of 0xFFFFFFFF to the right by the exponent N and may complement the result of such shifting. For example, in dividing 1500 by 48, the processor 250 may generate a power-of-two mask P2_M of 0x0000000F for a power-of-two P2 of 16.

In block 435, the processor 250 may compute a remainder or modulus of dividing the intermediate remainder IR by the power-of-two P2 using the determined power-of-two mask P2 in a manner similar to block 335 of FIG. 3. In particular, the processor 250 may perform a bit-wise AND operation of an intermediate remainder IR of 732 (0x2DC) and a power-of-two mask P2_M of 15 (0xF) to obtain a modulus of 12 (0xC).

In block 440, the processor 250 may update a flag F to indicate whether dividing the dividend X by the divisor Y results in a remainder in a manner similar to block 340 of FIG. 3. In the example of dividing 1500 by 48, the processor may assign the flag F a value of 1 since the modulus obtained in block 435 is non-zero.

In block 445, the processor 250 may compute a reduced power-of-two RP2 by right shifting the power-of-two P2 by a reduction factor RF. In one embodiment, the reduction factor RF has a value of 2 to obtain a reduced power-of-two RP2 that is a quarter of the power-of-two P2. However, it should be appreciated that other reduction factors RF may be used. Accordingly, in one embodiment, the processor 250 may assign the reduced power-of-two RP2 a value of 4 (16 right shifted twice) for a divisor Y of 48. In block 462, the processor 250 may assign an increased shifted divisor ISY to the product of the shifted divisor SY and the reduced power-of-two RP2. For example, the processor 250 may compute an increased shifted divisor ISY of 12 (3 times 4) for a divisor Y of 48.

The processor 250 may divide the shifted remainder SR by the increased shifted divisor ISY to update a remainder quotient RQ by using arithmetic and logical operations such as subtraction, addition, and comparison operations as depicted in blocks 463, 464, 466, and 467. In block 463, the processor 250 may initialize a remainder quotient RQ to an initial value (e.g. 0).

In block 464, the processor 250 may utilize a comparison operation to determine whether the shifted remainder SR has a predetermined relationship to (e.g. greater than or equal to) the increased shifted divisor ISY. In response to determining that the shifted remainder SR has the predetermined relationship to the increased shifted divisor ISY, the processor 250 may continue to block 465 in order to update the shifted remainder SR and the remainder quotient RQ. Otherwise, the processor 250 may continue to block 470 to further update the shifter remainder SR based upon the increased shifted divisor ISY. In the present example, the processor 250 in one embodiment may continue to block 465 since the shifted remainder SR of 45 is greater than the increased shifted divisor of 12.

In block 465, the processor 250 may update the shifted remainder SR by subtracting the increased shifted divisor ISY from the shifted remainder SR. For example, the increased shifted divisor ISY of 12 may be subtracted from a shifted remainder SR of 45 to obtain an updated shifted remainder SR of 33. In block 467, the processor 250 may update the remainder quotient RQ by incrementing the remainder quotient RQ by the reduced power-of-two RP2. For example, the remainder quotient RQ may equal 4 after reducing the shifted remainder SR to 33 in the present example.

After updating the shifted remainder SR and the remainder quotient RQ, the processor 250 may return to block 464 to determine whether the updated shifted remainder SR has a predetermined relationship to (e.g. greater than or equal to) the increased shifted divisor ISY. In dividing 1500 by 48, the processor 250 in one embodiment may perform the operations of blocks 464, 465 and 467 until the processor 250 obtains a shifted remainder SR of 9 and a remainder quotient SQ of 12.

In response to the shifted remainder SR being less than the increased shifted divisor ISY, the processor 250 then may divide the updated shifted remainder SR by the shifted divisor SY using arithmetic and logical operations other than a division operation such as, for example, subtraction, addition, and comparison operators as depicted in blocks 470, 472 and 474 and in a manner similar to blocks 370, 372 and 374 of FIG. 3. In an example of dividing 1500 by 48, the processor 250 as result of performing the operations of blocks 470, 472 and 474 may obtain remainder quotient RQ of 15 and a shifted remainder SR of 0 which is less than the shifted divisor SY of 3.

In response to the shifted remainder SR being less than the shifted divisor SY, the processor 250 in block 475 may compute the quotient Q in a manner similar to block 375 of FIG. 3. In particular, the processor 250 may add the remainder quotient RQ to the product of the shifted quotient SQ and the power-of-two P2 to obtain the quotient Q. In the example of dividing 1500 by 48, the processor 250 may obtain a quotient Q of 31 by adding a remainder quotient RQ of 15 to the product 16 (i.e. a shifted quotient SQ of 1 times a power-of-two of 16).

In block 480, the processor 250 may determine whether dividing the dividend X by the divisor Y resulted in a remainder. In particular, the processor 250 may determine that there is a remainder if the flag F or the shifted remainder SR is non-zero. For example, the processor 250 may determine that dividing 1500 by 48 results in a remainder since the flag F is non-zero. In response to determining that there is a remainder, the processor 250 in block 490 may increment the quotient Q by 1 in order to account for another fragment to send the remaining byte(s) of the packet.

The enhanced algorithm depicted in FIG. 4 may reduce the number of iterations performed in blocks 370-374 of FIG. 3 by using an increased shifted divisor ISY. The increased shifted divisor ISY reduces the shifted remainder SR more each iteration than the shifted divisor SY. As a result, the number of iterations is reduced and fewer processor cycles are consumed to compute the quotient.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus comprising
   a network interface to receive a packet of a packet size and to send fragments of a fragment size, and
   a processor to fragment the packet into a number of fragments determined by a quotient of the packet size divided by the fragment size, wherein the processor computes the quotient by
   assigning the packet size to a dividend and the fragment size to a divisor,
   bit-shifting the dividend and the divisor to the right by a first integer to obtain a shifted dividend and a shifted divisor,
   generating a shifted quotient and an intermediate remainder that are indicative of the shifted dividend divided by the divisor,
   bit-shifting the intermediate remainder to the right by the first integer to obtain a shifted remainder,
   generating a remainder quotient indicative of the shifted remainder divided by the shifted divisor, and
   generating the quotient based upon the shifted quotient, the remainder quotient, and the first integer.

2. The apparatus of claim 1 wherein the processor generates the remainder quotient by
   repeatedly subtracting the shifted divisor from the shifted remainder until the shifted remainder has a predetermined relationship to the shifted divisor, and
   updating the remainder quotient based upon the repeated subtracting of the shifted divisor from the shifted remainder.

3. The apparatus of claim 1 wherein the processor generates the remainder quotient by
   repeatedly subtracting an increased shifted divisor that is larger than the shifted divisor from the shifted remainder until the shifted remainder has a predetermined relationship to the increased shifted divisor, and
   updating the remainder quotient based upon the repeated subtracting of the increased shifted divisor from the shifted remainder.

4. The apparatus of claim 1 wherein the processor generates the remainder quotient by
   generating an increased shifted divisor based upon a second integer that is smaller than the first integer, and
   repeatedly subtracting the increased shifted divisor from the shifted remainder until the shifted remainder has a predetermined relationship to the increased shifted divisor,
   incrementing the remainder quotient by the second integer for each time the increased shifted divisor is subtracted from the shifted remainder,
   in response to the shifted remainder having the predetermined relationship to the increased shifted divisor, repeatedly subtracting the shifted divisor from the shifted remainder until the shifted remainder has a predetermined relationship to the shifted divisor, and
   incrementing the remainder quotient by one each time the shifted divisor is subtracted from the shifted remainder.

5. The apparatus of claim 1 wherein the processor generates the shifted quotient by
   repeatedly subtracting the divisor from the shifted dividend until the shifted dividend has a predetermined relationship to the divisor, and
   updating the shifted quotient based upon the repeated subtracting of the divisor from the shifted dividend.

6. The apparatus of claim 1 wherein the processor generates the intermediate remainder by
   generating a power-of-two based upon the first integer, and
   subtracting a product of the shifted quotient, the power-of-two, and the divisor from the dividend.

7. The apparatus of claim 1 wherein the processor further increments the quotient by one in response to determining that dividing the dividend by the divisor results in a remainder.

* * * * *